United States Patent [19]
Yee

[11] Patent Number: 5,588,631
[45] Date of Patent: Dec. 31, 1996

[54] LOCKING ARTICLE ANCHORING ASSEMBLY FOR TRUCK BEDS

[76] Inventor: William J. Yee, 4361 Keystone Ave., Culver City, Calif. 90232

[21] Appl. No.: 236,171

[22] Filed: May 2, 1994

[51] Int. Cl.$^6$ ........................................... A47F 7/00
[52] U.S. Cl. .................. 248/553; 211/4; 70/58; 248/221.12; 248/272.41
[58] Field of Search .................. 248/551–553, 248/222.4, 221.12, 272.41; 70/232, 58; 211/7, 8, 4

[56] References Cited

U.S. PATENT DOCUMENTS

| | | | |
|---|---|---|---|
| 3,859,826 | 1/1975 | Singer | 70/58 |
| 4,088,228 | 5/1978 | Schwalbe | 211/4 |
| 4,260,063 | 4/1981 | Bennett | 211/4 |
| 4,540,092 | 9/1985 | DeSantis | 211/4 |
| 4,573,584 | 3/1986 | Otema | 211/4 |
| 5,022,534 | 6/1991 | Briggs | 211/4 |

Primary Examiner—Alvin C. Chin-Shue
Attorney, Agent, or Firm—William L. Chapin

[57] ABSTRACT

An assembly for anchoring and lockably securing articles such as tool storage boxes to the bed of a pick-up truck includes an elongated hollow beam fastenable to a truck bed and having through one wall thereof a plurality of longitudinally spaced apart perforations. Elongated members that are securable at a rear-end thereof to a tool box or other such article have enlarged heads that are insertable through the perforations in the beam wall. A locking bar longitudinally slidably held within the beam is provided with a plurality of longitudinally spaced apart cutout sections alignable with the perforations through the beam wall with the locking bar in a first, unlocked position in which the locking members may be inserted through the perforations and cutout sections. With the locking bar slid to a second locking position, portions of the locking bar engage the heads of the locking members protruding inward through the perforations, thereby preventing withdrawal of the locking members. A key lock adjacent an outer end of the locking bar is lockable to prevent longitudinal motion of the locking bar from a locked to an unlocked position, thereby securing the locking members and articles fastened thereto against theft.

11 Claims, 3 Drawing Sheets

LOCKING ARTICLE ANCHORING ASSEMBLY FOR TRUCK BEDS

BACKGROUND OF THE INVENTION

1. Field of the Invention

The present invention relates to accessories for vehicles. More particularly, the invention relates to a device for lockingly securing storage boxes for tools and the like, bicycles and other such articles to the bed of a pick-up truck.

2. Description of Background Art

Trucks having an unprotected storage area, such as a flat bed truck or pick-up truck are frequently used to transport tools or equipment to job sites. Pick-up trucks are also used to transport other objects, including bicycles, jet skis and other articles used for recreational purposes.

Articles transported in open storage compartments of trucks, particularly pick-up trucks, are subject to theft. Also, objects which are not secured to the truck bed are subject to damage or loss if the truck is driven over rough terrain, or maneuvered vigorously enough to dislodge objects from their resting places on the truck bed. Accordingly, it would be desirable to provide a device capable of securing to the bed of a truck containers for storing tools or other such items, or larger articles such as bicycles.

A number of devices for anchoring or attaching storage boxes or similar structures to truck beds are disclosed in the prior art. The present inventor is aware of the following U.S. patents that disclose such devices.

Miller, et al, U.S. Pat. No. 4,249,684, Feb. 10, 1981, Removably Anchored Box:

Discloses a tool box securable to a pair of parallel laterally spaced apart anchor rails attached to a flat horizontal mounting wall such as the floor of a truck bed, at a distance slightly less than spacing between lateral side walls of the box, which has an upwardly recessed bottom wall to allow the box to fit over the anchor rails. In one embodiment, an elongated arm pivotably mounted to the inner surface of each of the two lateral side walls of the box has fastener pins on the lower end of the arm that may be pivoted into a locking position in slots provided in the upper surface of the anchor rail, that position being maintained by pressing the upper end of the arm behind a keeper attached to the inner lateral wall surface of the box. In a second embodiment, rods rotatably secured to the inner side walls of the box have bent ends that are lockably secured to slots in anchor rails by rotating the rods.

Whatley, U.S. Pat. No. 4,531,774, Jul. 30, 1985, Truck Tool Box Anchor Assembly:

Discloses an anchor assembly for downward reception in an upwardly opening stake receiving socket formed in the upper marginal edge portion of the wall of a pickup truck load bed. The anchor assembly includes a base plate for disposition within the upper portion of the load bed sidewalls socket and the upper end portion of a pair of depending arms are shiftably supported from opposite marginal edge portions of the base plate for oscillatory movement of the lower end portions of the arms toward and away from each other. The arms may closely oppose corresponding remote wall portions of the socket and an upright elongated fastener is threaded through a central portion of the base plate and includes a lower end portion disposed between the lower end portions of the arms and having an abutment carried thereon. The abutment and the adjacent sides of the arms include coacting slidingly engageable wedge surfaces for wedging the lower end portions of the arms away from each other into tight frictional engagement with the remote wall portions of the socket responsive to upward movement of the abutment relative to the arms upon upward threading of the fastener through the base plate. The upper end of the fastener projects above the base plate and may be used to anchor the tool box bottom wall in overlying position supported from the associated load bed sidewall.

Mullican, U.S. Pat. No. 4,728,017, Mar. 1, 1988, Clamp-On Storage Container For Pickup Trucks:

Discloses an anti-theft, portable clamp-on storage container for mounting in the load bed of a pickup truck that comprises relatively movable top and bottom container sections which close to form an enclosure for goods. A screw clamp having an inverted U-shaped fixed jaw and a screw actuated movable jaw cooperable therewith is mounted with the inverted U-shaped fixed jaw supported exteriorly of the container bottom section and with the screw actuator for the movable jaw extending inside of the container. The fixed jaw is positioned to slide down over one of the side or end panels of the pickup truck load bed when the container is lowered into the floor of the load bed from above. A handle for turning the screw actuator is provided on the end of the screw actuator which is inside of the container so that the screw actuator can only be turned when the container is open. A lock is provided to lock the container closed so that the screw clamp once clamped to the side or end panel of the load bed cannot be loosened without unlocking and opening the container.

Harrison, U.S. Pat. No. 4,760,986, Aug. 2, 1988, Mount For Pickup Trucks:

Discloses a mount for mounting objects to a side of a pickup truck bed comprising an outboard piece adapted to be mounted partially within an inverted channel-shaped top portion of the pickup truck bed side and an inboard piece adapted to be mounted to the outboard piece and clamped to the side top portion, and fastening means for releasably fastening the outboard and inboard pieces together. One of the pieces is formed with an elongated pressure distribution bar and the other piece is formed with an elongated groove sized to receive the pressure distribution bar.

Hoogland, U.S. Pat. No. 4,998,425, Mar. 12, 1991, Tool Box Securing Arrangement:

Discloses an arrangement to releasably secure each of the two doors of a utility carrier box mounted transversely behind the cab of a pick-up vehicle and on the side walls of the pick-up, the arrangement comprising staples secured to the end walls of the box below the end flanges of the doors when the doors are in closed position, and a steep strap extending from below one staple, over the top of the closed box and down to a point beyond the other staple, and in conformity with the surface of the closed box over which the strap means extends, each end of the strap being slotted to enable the link of the staple beyond which it extends to be passed through the slot and to receive the link of a padlock which is locked.

Farmer, Jr, U.S. Pat. No. 5,052,737, Oct. 1, 1991, Attachment Structure And Method For Securing A Toolbox On A Pickup Truck:

Discloses an attachment structure for attaching to the side panels of a pickup truck a toolbox of the type having a lower part positioned within the bed of the pickup truck, a top part which is longer than the lower part and overhangs the side panels and a shelf interconnecting the lower and upper parts. The attachment structure secures the toolbox to the side panels without the need to drill holes into the tops of the side panels. A retainer plate is slidable through an end wall of the lower part of the toolbox between a retracted position mostly within the toolbox and an extended position mostly outside of the toolbox. A threaded bolt engages this retainer plate to urge it upwardly against an inner portion of the side panel which projects inwardly over the retainer plate.

Pugh, U.S. Pat. No. 5,169,200, Dec. 8, 1992,
Pickup Truck Storage Box:

Discloses a pickup truck storage box for use in the cargo bed of a pickup truck. It has left and right edge brackets that receive left and right upstanding box panels; a center stake that fits between inner edges of the box panels to keep the outer edges of the box panels seated in the edge brackets; a channel member that fits over the upper edge of the truck bed's forward wall; a hinged, locking lid attached to the channel member; a hinged cross-member between the channel member and the upper, inner edges of the box panels; and cap strips that cover the top edges of the box panels.

The present invention was conceived of to provide an improved anchoring assembly attachable to a truck bed and capable of anchoring and securing with a key lock tool boxes and other such articles.

OBJECTS OF THE INVENTION

An object of the present invention is to provide an anchoring assembly for lockingly attaching storage boxes or other articles such as bicycles or jet skis to the bed of a pick-up truck.

Another object of the invention is to provide a locking anchoring assembly for truck beds that is securable to the wall of a truck bed.

Another object of the invention is to provide a locking anchoring assembly for truck beds that employs a slidable locking bar which simultaneously secures a plurality of fasteners inserted into selected receptacles provided in the device.

Another object of the invention is to provide a locking anchoring assembly for truck beds that permits securement of storage boxes or other articles at a plurality of laterally spaced apart positions relative to the truck bed.

Another object of the invention is to provide an article anchoring assembly that may be used to simultaneously secure a plurality of storage boxes and/or other articles, in various combinations.

Another object of the invention is to provide an article anchoring assembly that may be fastened to a wall and which includes a mechanism operable by either of two key locks to lockingly secure articles such as storage boxes to the assembly.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiments. Accordingly, I do not intend that the scope of my exclusive rights and privileges in the invention be limited to details of the embodiments described. I do intend that equivalents, adaptations and modifications of the invention reasonably inferable from the description contained herein be included within the scope of the invention as defined by the appended claims.

SUMMARY OF THE INVENTION

Briefly stated, the present invention contemplates an anchoring assembly adapted to be fastened to a structure wall, the assembly providing means for lockably and unlockably securing articles such as storage boxes to the assembly.

A basic embodiment of the anchoring assembly according to the present invention includes an elongated hollow beam fastenable in a laterally disposed position to the front wall of a pick-up truck bed. The beam has through its rear wall a plurality of perforations that are laterally spaced apart at regular intervals and which communicate with the hollow interior space of the beam. The anchoring assembly includes an elongated locking bar of uniform transverse cross-section slidably contained within the hollow interior space of the beam. The locking bar has formed in a longitudinally disposed edge wall thereof a plurality of generally semi-circular shaped notches cut inwards from the edge wall, and spaced apart at the same intervals as the perforations through the rear wall of the beam. With the locking bar slid to a first, unlocked position, each perforation of the beam is aligned with a notch of the locking bar, thus allowing circular cross-section locking members protruding from a tool box, or other such article, to be inserted through the perforations into the interior space of the beam. With the locking bar slid laterally left or right, flats comprising the uncut portions of the locking bar edge wall between slots obstruct a portion of the perforations through the rear beam wall. The slots engage notches or abut heads of article locking members, preventing the locking members from being removed from the perforations and thereby preventing the article from being moved relative to the anchoring assembly. In the preferred embodiment, the locking bar is secured against movement relative to the beam by one or two key locks, preventing unauthorized removal of an article from the truck.

DESCRIPTION OF THE PREFERRED EMBODIMENTS

Referring now to FIGS. 1 through 15, a locking article anchoring assembly for truck beds according to the present invention is shown.

Figure 1:
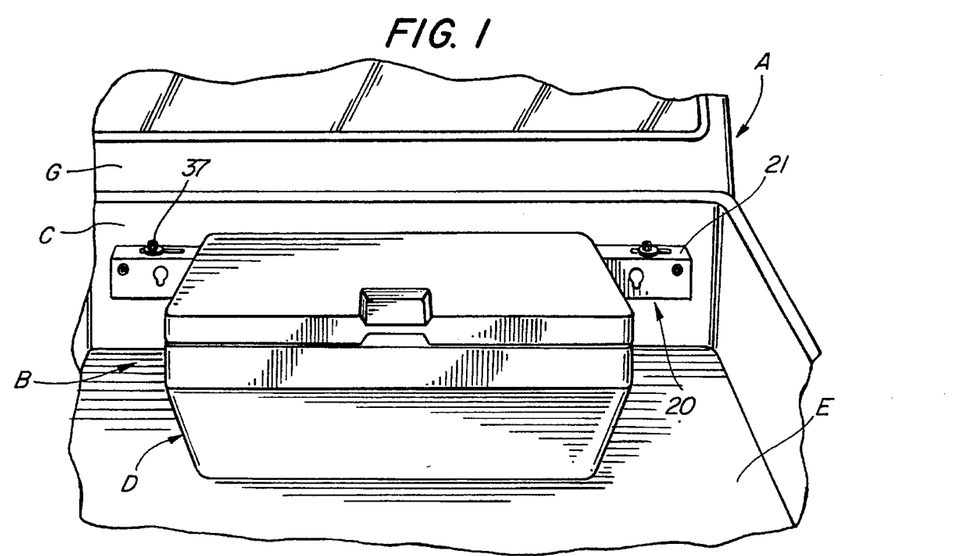
FIG. 1 is a rear perspective view of a locking article anchoring assembly for truck beds according to the present invention, showing a tool box secured to the bed of a pick-up truck by the assembly.

As shown in FIG. 1, locking anchoring assembly 20 according to the present invention includes a horizontally disposed, elongated hollow beam 21 attached to front wall C of a cargo compartment B of a pick-up truck A. As shown in FIG. 1, a toolbox D resting on floor or bed E of pick-up truck cargo compartment B is lockingly secured to anchoring assembly 20, in a manner to be described in detail below.

Figure 2:
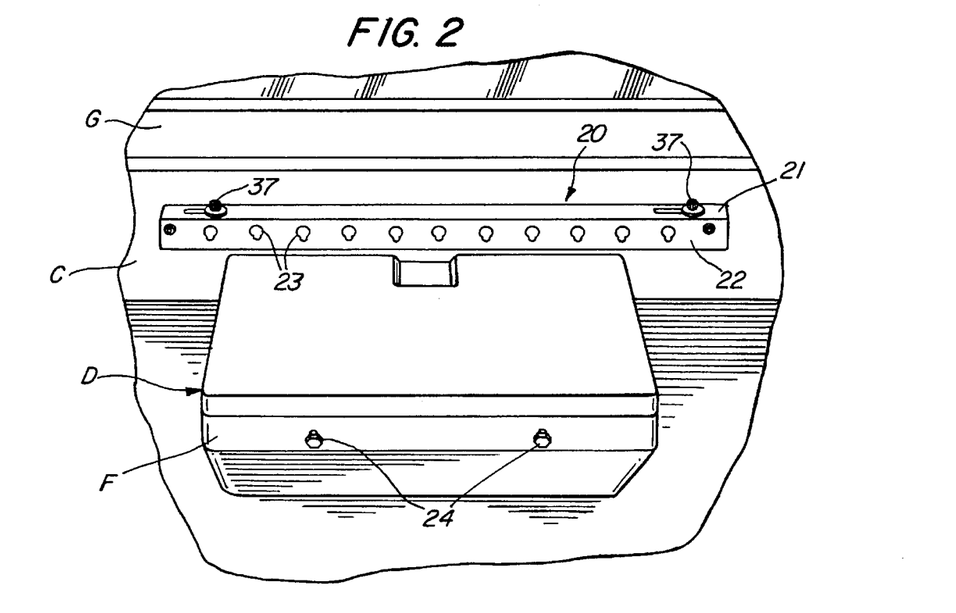
FIG. 2 is a rear perspective view similar to that of FIG. 1, but showing the tool box detached from the assembly and reversed to show locking members protruding from the rear wall of the tool box.
Figure 3:
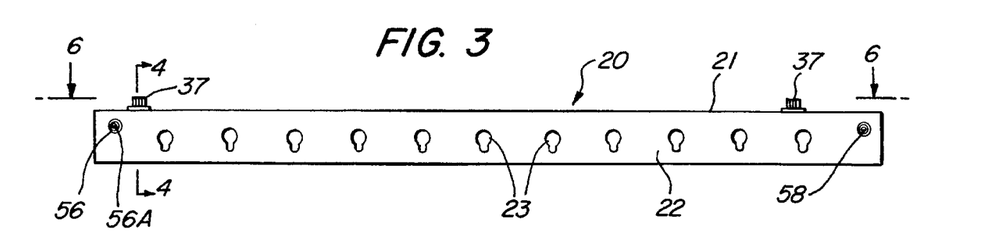
FIG. 3 is a rear elevation view of the anchoring assembly of FIG. 1.

As shown in FIGS. 2 and 3, rear wall 22 of beam 21 is provided through the thickness dimension thereof a plurality of longitudinally aligned perforations 23 spaced apart at regular intervals. As is shown in FIG. 2, front wall F of tool box D is provided with a pair of laterally spaced apart locking members 24 of the proper size and location to be insertably receivable in a pair of perforations 23 in locking accessory 20.

Figure 7:
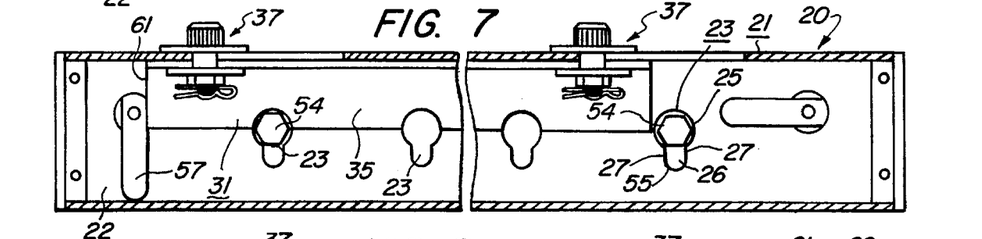
FIG. 7 is a view similar to that of FIG. 6, but showing a locking bar comprising part of the assembly in a first unlocked position.

Referring now to FIGS. 3 and 7, perforations 23 through rear wall 22 of anchoring assembly 20 may be seen to have a keyhole shape, i.e., having an upper generally circularly-shaped portion 25 and a lower downwardly depending oval slotted portion 26 communicating with the upper portion and having side walls 27 located parallel to equidistant from a diameter of the upper portion. The reason for perforations 23 having a keyhole shape will become apparent from the ensuing description of other structural features of anchoring assembly 20.

Figure 4:
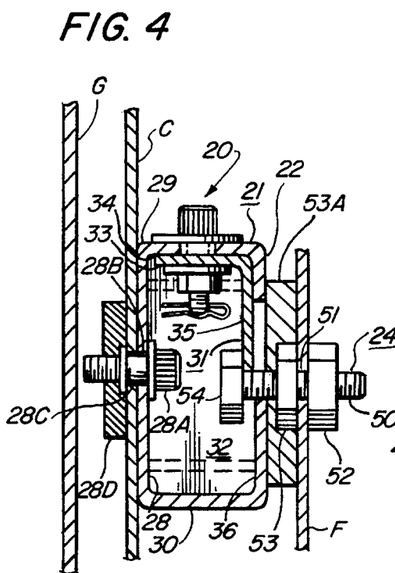
FIG. 4 is a transverse sectional view of the assembly of FIG. 3, taken along line 4—4 of FIG. 3.
Figures 4A, 5:
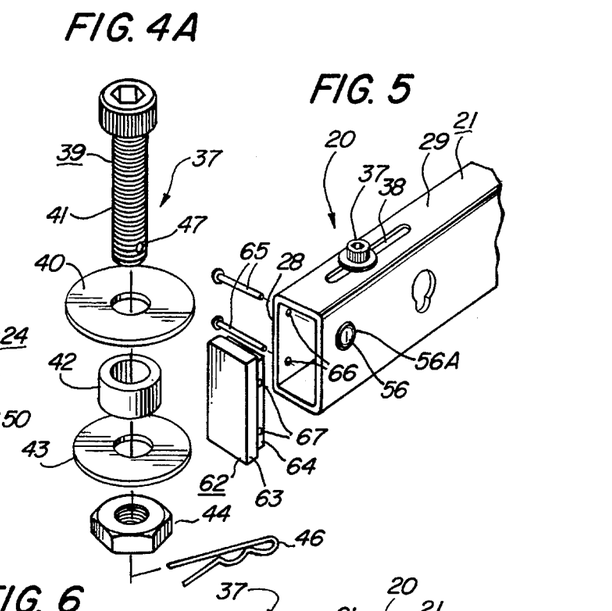
FIG. 4A is an exploded fragmentary view of part of the assembly of FIG. 4.
FIG. 5 is a fragmentary upper perspective view of the assembly of FIG. 3.
Figure 6:
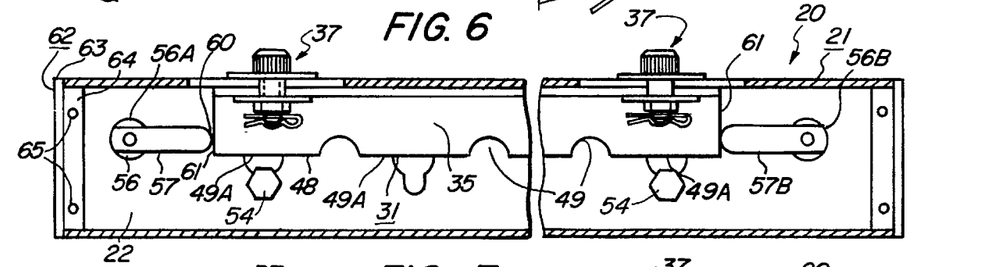
FIG. 6 is a longitudinal sectional view of the assembly of FIG. 3, taken along line 6—6 of FIG. 3.

Referring now to FIGS. 4 through 6 as well as FIG. 3, and particularly to FIG. 4, hollow beam 21 may be seen to have a generally rectangular transverse section including a flat rear wall 22, a flat front wall 28, and flat parallel upper and lower walls 29 and 30, respectively, disposed perpendicularly to the front and rear walls. As shown in FIGS. 4 through 6, anchoring assembly 20 includes an elongated locking bar 31 slidably contained within the hollow interior space 32 of beam 21. As shown in FIG. 4, locking bar 31 has an inverted L-shaped transverse section, including a flat upper plate section 33 that is adapted to slide longitudinally along the lower inner wall surface 34 of upper wall 29 of beam 21. Locking bar 31 also has a rear vertically disposed plate section 35 that depends downwardly from upper plate section 33 and which is adapted to slide longitudinally relative to the inner surface 36 of rear wall 22 of beam 21.

Referring still to FIGS. 4 through 6, it may be seen that locking bar 31 is slidably supported below upper wall 29 of beam 21 by means of a pair of vertically disposed fasteners 37 attached to upper plate section 33 of locking bar 31 and protruding upwards through a pair of longitudinally aligned, longitudinally elongated, generally rectangularly shaped perforations 38 through the upper wall of the beam. As may be seen best by referring to FIGS. 4, 4A, and 5, fastener 37 includes a headed screw 39, which may be a socket head screw, that passes through the central circular hole of a washer 40 of larger outer diameter than the width of perforation 38. The threaded shank 41 of screw 39 protruding below washer 40 is insertably received by a cylindrical spacer bushing 42 slidably positioned in perforation 38. Preferably, bushing 42 is made of nylon or similar low-friction material, so that the bushing can slide freely along the edge walls of perforation 38. That portion of screw shank 41 protruding below through bushing 42 is insertably received by a lower flat washer 43 located below lower wall surface 34 of upper beam wall 29. A nut 44 screwed onto lower threaded shank portion 41 of screw 39 holds the aforementioned components of fastener 37 in slidably engagement with perforation 38 of upper beam wall 29. Bushing 42 is of the proper length to prevent over-tightening screw 39 on nut 44 to the extent that washers 40 and 43 would exert undue sliding friction on upper wall 29 of beam 21. Preferably, nut 44 has a nylon insert, not shown, that frictionally resists vibration loosening or unwanted disassembly of the nut on screw 39. Also, nut 44 preferably is further secured from inadvertent loosening or unwanted removal from screw 39 by means of a cotter pin 46 inserted through a transverse hole 47 provided through the lower end of shank 41 of the screw.

As shown in FIG. 4, beam 21 of anchoring assembly 20 is attached to front wall C of a pickup truck bed by means of bolts 28A protruding forward through aligned holes 28B and 28C through rear wall 28 of the beam, and front wall C, respectively. Preferably, bolts 28A are secured into holes provided in an elongated, flat retainer strap 28D positioned in front of front beam wall 28. This construction prevents removal of locking assembly 20 from the front wall of the truck bed, unless the locking assembly is unlocked to permit moving locking bar 31 to a position which allows access to the heads of bolts 28A to unthread them from retainer strap 28D.

The manner of securing a storage box or other such article to anchoring assembly 20 may be best understood by referring to FIGS. 4, 6 and 7. As shown in FIGS. 6 and 7, rear vertically disposed plate section 35 of locking bar 31 has a straight, horizontally disposed lower edge wall 48 parallel to upper plate section 33 of the locking bar. As may be seen best by referring to FIG. 6, lower edge wall 48 of locking bar 31 has formed therein a plurality of longitudinally aligned and spaced apart, generally semicircularly shaped notches 49. The uncut portions of lower edge wall 48 adjacent each notch 49 comprise a plurality of horizontally disposed flats 49A. Notches 49 are spaced apart at the same regular intervals as perforations 23 through rear wall 22 of beam 21, and are preferably of slightly larger diameter. Also, beam 21 and locking bar 31 are so constructed as to position notches 49 concentrically over the upper, circularly-shaped portions 25 of keyhole-shaped perforations 23 through rear wall 22 of beam 21, with the locking bar positioned longitudinally with respect to beam 21 to an unlocked position, as shown in FIG. 7. In this position, the entire cross section of perforations 23 is available to insertably receive the heads of locking members 24 protruding forward from rear wall F of storage box D.

As shown in FIGS. 2 and 4, each of the two locking members 24 consists of a bolt having a threaded shank 50 that protrudes through a hole 51 provided through the thickness dimension of storage box rear wall F, and is secured thereto by inner and outer nuts 52 and 53. As shown in FIG. 4, a flat, resilient spacer member 53A may be secured between box wall F and rear wall 22 of beam 21, to provide vibration isolation between the truck bed and box. Bolt 24 has a circular head 54 of slightly smaller diameter than upper circularly-shaped portion 25 of perforation 23 in rear wall 22 of beam 20, thus allowing the head to be inserted forward through the perforation. Also, shank 50 of bolt 24 has a diameter slightly smaller than the width of lower oval-shaped slotted portion 26 of keyhole-shaped perforation 23, thus allowing the shank to move downward and seat on lower wall 55 of the slotted portion of the slot.

With shanks 50 of bolts 24 resting in lower slotted portions 26 of keyhole-shaped perforations 23 through rear wall 22 of beam 21, locking bar 31 may be slid longitudinally to a locking position, as shown in FIG. 6. The heads of screws 39 may be grasped to facilitate moving locking bar 31. In the locked position, shown in FIG. 6, flats 49A in lower edge wall 48 of locking bar 31, vertically overlie the shanks of locking members 24, and horizontally underlie heads 54 of the locking members. Thus positioned, locking bar 31 prevents locking members 24 from being disengaged from beam 21, thereby securing storage box D to truck bed E. Anchoring assembly 20 preferably includes means for securing locking bar 31 in a locked position by means of one or two key locks, thus preventing unauthorized removal of a tool box or other article attached to the anchoring assembly from the truck. That locking means will not be described.

Referring now to FIGS. 3 and 6, anchoring assembly 20 may be seen to include a cylinder lock 56 mounted in an aperture 56A through rear wall 22 of beam 21. Lock 56 has an inner cylinder attached to a transversely disposed arm 57 that protrudes radially outwards from the rear or inner end of the lock. Lock 56 also includes an aperture 58 adapted to insertably receive a key 59 that permits the cylinder and arm to be rotated from a horizontally disposed, locked position, as shown in FIG. 6, to a vertically disposed, unlocked position, as shown in FIG. 7.

Figure 8:
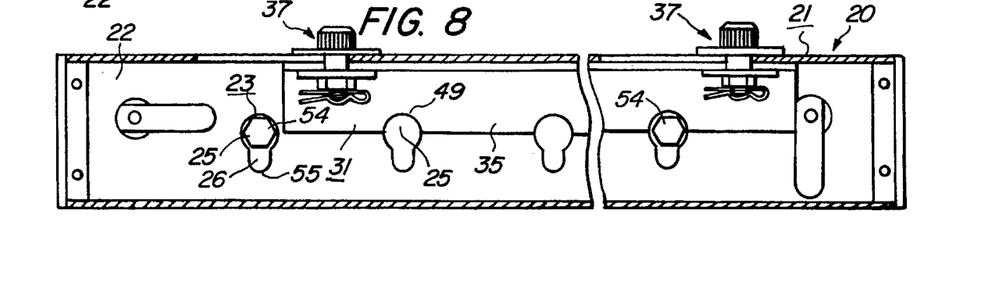
FIG. 8 is a view similar to that of FIG. 5, but showing a locking bar comprising part of the assembly in a second unlocked position.

Lock 56 is so located relative to slidable locking bar 31 that the outer edge wall 60 of lock arm 57 abuts the outer vertically disposed edge wall 61 of rear vertical plate section 35 of the locking bar, with the lock in a locked position, as shown in FIG. 6. With this arrangement, slidable locking bar 31 is prevented from moving left to an unlocked position. Rightward movement of locking bar 31 to an unlocked position is prevented by abutting contact of right-hand vertical edge wall 61 with a member attached to beam 21. Preferably, this abutting member is the arm 57B of a second, right-hand cylinder lock 56B mirror symmetric with first, left-hand lock 56. To unlock slidable locking bar 31 to permit removal or attachment of a storage box or other article to anchoring assembly 20, a key is used to rotate arm 57 of left-hand lock 56 counterclockwise position, thereby allowing leftward movement of the locking bar, as shown in FIG. 7. If anchoring assembly 20 is provided with a second, right-hand key lock 56B, this lock may be operated to rotate arm 57B thereof to a clockwise unlocked position, thereby allowing rightward movement of locking bar 31 to a second, rightward unlocked position, as shown in FIG. 8. This construction allows release of the box from either side of the truck bed.

Preferably the rectangular openings at opposite ends of anchoring assembly beam 21 are provided with end caps, for the purpose of keeping rain, dust and foreign objects out of the hollow interior space of the beam, and for preventing tampering with the assembly. Thus, as shown in FIGS. 4 and 5, anchoring assembly 20 preferably includes a pair of end caps 62 each having rectangular-shaped base plate 63 of approximately the same size and shape as the outer transverse section of beam 21. Each end cap 62 also has a boss section 64 that protrudes outward from base plate 63. Boss section 64 is concentric with base plate 63, and has a rectangular-shaped transverse section of slightly smaller size than base plate 63 and of the proper size to be insertably and snugly received by the rectangular openings in both ends of beam 21. Each end cap 62 is secured within beam 21 by a pair of headed pins or screws 65 that pass through a pair of vertically aligned holes 66 in front wall 28 of beam, and a pair of aligned bores 67 through boss section 64 of each end cap.

Figures 9, 11:
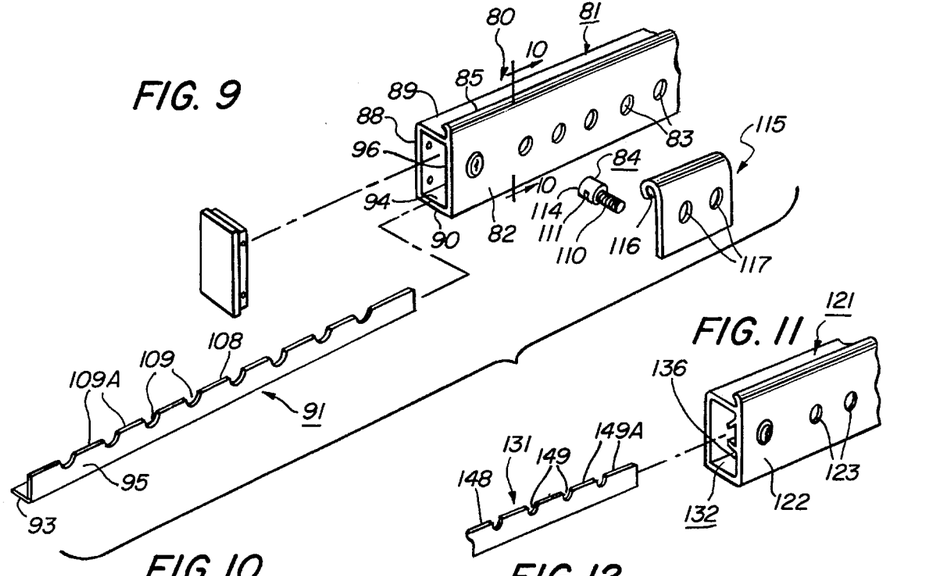
FIG. 9 is an exploded perspective view of a second embodiment of a locking anchoring assembly according to the present invention.
FIG. 11 is an exploded perspective view of a modification of a locking anchoring assembly according to the present invention.
Figures 10, 12, 13, 14, 15:
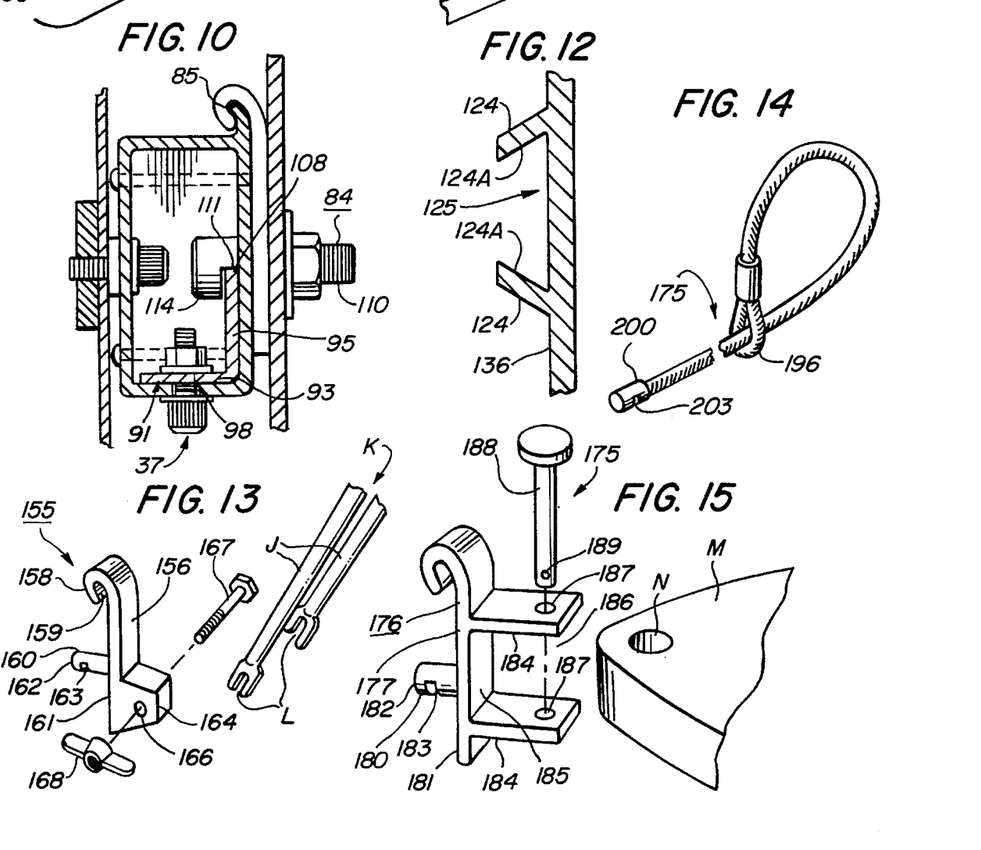
FIG. 10 is a transverse section view of the assembly of FIG. 9, taken along line 10—10.
FIG. 12 is a fragmentary partly sectional view of the beam of FIG. 11.
FIG. 13 is an exploded perspective view of a modified accessory mounting bracket for the anchoring assembly of FIG. 10, useful for securing bicycles.
FIG. 14 is a perspective view of a locking cable usable with the assembly of FIG. 13.
FIG. 15 is an exploded perspective view of another modified accessory mounting bracket for the anchoring assembly of FIG. 10, useful for securing jet skis.

FIGS. 9 and 10 illustrate a second embodiment of a locking article anchoring assembly according to the present invention. This embodiment allows the keyhole-shaped perforation 23 shown in FIG. 3 and described above to be replaced by circular perforations, for reasons which will now be described.

Referring now to FIGS. 9 and 10, modified anchoring assembly 80 may be seen to include an elongated hollow beam 81 having a generally rectangular-shaped transverse section. Beam 81 is provided through the thickness dimension thereof with a plurality of longitudinally aligned circular perforations or holes 83. Perforations 83 are adapted to receive laterally spaced apart slotted locking bolts 84 attached to a tool box or other accessory not shown.

As shown in FIGS. 9 and 10, hollow beam 81 may be seen to have a generally rectangular transverse section including a flat rear wall 82, a flat front wall 88, and flat and parallel upper and lower walls 89 and 90, respectively, disposed perpendicularly to the front and rear walls. For reasons which are described below, beam 81 may optionally be provided with an integral longitudinally disposed, upwardly protruding finger section 85 that has a rear wall surface that is continuous with rear wall 82 of the beam. As shown in FIGS. 9 and 10, finger section 85 has a generally uniform thickness cross section, and curves upwardly and forwardly over upper wall 89 of beam 81.

Referring still to FIGS. 9 and 10, anchoring assembly 80 may be seen to include an elongated locking bar 91 slidably contained within the hollow interior space 92 of beam 81. As shown in FIGS. 9 and 10, locking bar 91 has an L-shaped transverse section, including a flat lower plate section 93 that is adapted to slide longitudinally along the upper inner wall surface 94 of lower wall 90 of beam 81. Locking bar 91 also has a rear vertically disposed plate section 95 that depends upwardly from lower plate section 93 and which is adapted to slide longitudinally relative to the inner surface 96 of rear wall 82 of beam 81. Locking bar 91 is slidably supported on lower wall 90 of beam 81 by fasteners 37 which protrude through slotted perforations 98 through lower wall 90 of the beam, similar to slots 38 in upper wall 29 of beam 21, shown in FIG. 5. The structure and function of the slidable support for locking bar 91 are substantially identical to those described above for the basic embodiment of anchoring assembly, and for that reason will not be further described here.

The manner of securing a storage box or other such article to anchoring assembly 80 may be best understood by referring to FIGS. 9 and 10.

As shown in FIGS. 9 and 10, rear vertically disposed plate section 95 of locking bar 91 has a straight, horizontally disposed upper edge wall 108 parallel to lower plate section 93 of the locking bar. As may be seen best by referring to FIG. 9, upper edge wall 108 of locking bar 91 has formed therein a plurality of longitudinally aligned and spaced apart, generally semi-circularly shaped notches 109. The uncut portions of upper edge wall 108 adjacent each notch 109 comprises a plurality of horizontally disposed flats 109A. Notches 109 are spaced apart at the same regular intervals as perforations 83 through rear wall 82 of beam 81, and are preferably of slightly larger diameter.

Beam 81 and locking bar 91 are so constructed as to position notches 109 concentrically over perforations 83 through rear beam wall 82, with the locking bar positioned longitudinally with respect to beam 81 in a first, unlocked position. In this position, the entire cross section of perforations 83 is available to insertably receive the heads of locking bolts 84. As shown in FIG. 9, each locking bolt 84 has a threaded shank 110, and a concentric circular cross section head 114 of slightly smaller diameter than perforation 83, thus allowing the head to be inserted forward through the perforation. Bolt head 114 has a rectangular cross section slot 111 cut transversely upward from the lower circumferential surface of the head. Slot 111 has the proper size and shape to insertably receive the thickness dimension of rear plate section 95 of the locking bar 91. Thus, with bolts 84 inserted into perforations 83 with slot 111 facing downwards and in vertical alignment with rear plate section 95 of locking bar 91, the locking bar may be slid longitudinally far enough for flats 109A of locking bar 91 to be insertably received into slots 111 of bolt heads 114, thus preventing bolts 84 from being withdrawn from perforations 83. Preferably, anchoring assembly 80 includes means for securing locking bar 91 in a locked position by means of one or two key locks, thus preventing unauthorized removal from a truck bed of a storage box or other article attached to the anchoring assembly. That locking means may be identical in structure and function to that described above for the basic embodiment of the anchoring assembly according to the present invention.

As shown in FIGS. 9 and 10, beam 81 of modified anchoring assembly 80 may optionally include an upwardly and rearwardly curved, longitudinally disposed "finger" bar 85 that protrudes above upper wall 89 of the beam and has a rear surface continuous with the rear surface of rear wall 82 of the beam. As shown in FIG. 10, bar 85 has a uniform transverse cross section having a shape somewhat similar to that of a crooked finger, hence the name. Since beam 81 including finger bar 85 has a uniform transverse section, the beam may conveniently and economically be fabricated as a continuous extrusion of any convenient length.

Finger bar 85 of beam 81 provides means for slidably mounting brackets attached to a storage box or other accessory by means of slotted bolts 84. Thus, as shown in FIGS. 9 and 10, anchoring assembly 80 may include an accessory mounting bracket 115 having in transverse section the shape of a thin plate bent to form an inverted J-shape. Formed between "bent" portions of bracket 115 is a downwardly concave opening 116. Opening 116 is adapted to slidably receive finger bar 85 of beam 80. Preferably, both finger bar 85 and opening 116 of bracket 115 are crooked or bent rearward so that the bracket may not be slid upwards away from beam 81. The larger, rear plate portion of bracket 115 has through the thickness dimension thereof one or more holes 117 adapted to receive locking bolts 84, which are secured to tool box or other accessory to be attached to beam 18.

FIGS. 11 and 12 show a first modified beam useable with both of the previously described embodiments of a locking anchoring assembly according to the present invention. As shown in FIG. 11, modified anchoring assembly beam 121 has a generally rectangularly shaped transverse section enclosing a hollow interior space 132. Rear wall 122 of beam 121 has a generally flat rear surface, and a plurality of longitudinally spaced apart perforations 123 through its thickness dimension. As shown in FIG. 11, perforations 123 are circular, as are the perforations 83 in the second embodiment of the anchoring assembly shown in FIGS. 9 and 10 and described above. However, those perforations could also be keyhole shaped, like the perforations 23 of the basic embodiment of the invention shown in FIG. 2.

As may be seen best by referring to FIGS. 11 and 12, the inner rear surface 136 of rear wall 122 of beam 121 has formed therein a pair of vertically spaced apart parallel, longitudinally disposed, plate-like ribs 124 that protrude obliquely towards one another into hollow interior space 132 from the inner rear surface of the rear beam wall. Ribs 124 form between the inner facing edge walls 124A thereof a longitudinally disposed, trapezoidal cross section keyway 125. Keyway 125 is adapted to slidably hold an elongated flat locking bar 131. Locking bar 131 has an upper edge wall 148 in which are formed a plurality of arcuately-shaped notches 149 spaced apart at regular longitudinal intervals and alternating with flats 149A comprising uncut portions of the upper edge wall. As shown in FIG. 12, notches 149 are of slightly larger diameter than, and concentrically aligned with perforations 123, with locking bar 131 slid to a first, unlocked position. As in the previously described embodiments of the anchoring assembly, locking bar 131 may be moved longitudinally to a location in which flats 149A are aligned with perforations 123, thus securing locking bolts protruding from a tool box or other article through the perforations and into interior space 132 of beam 121.

FIG. 13 shows a modified accessory bracket useful for anchoring a bicycle to the anchoring assembly shown in FIGS. 9 and 10.

As shown in FIG. 13, bicycle mounting bracket 155 includes a body 156 with a front portion that has a uniform transverse section having the shape of a plate bent into an inverted J having a long, straight, long lower leg 157 and a short upper leg 158 that curves arcuately downward and parallel to the long leg. A downwardly concave opening 159 between legs 157 and 158 of bracket 155 is adapted to slidably receive finger bar 85 of beam 81.

Bracket 155 also includes a cylindrical stud 160 that protrudes perpendicularly forward from the flat front wall 161 of body 156, at a location near the horizontal mid-plane of the bracket. Stud 160 has located near its front transverse wall 162 a slot 163 cut transversely upward from the lower circumferential surface of the stud. Slot 163 has the proper size and shape to insertably receive the thickness dimension of rear plate section 95 of locking bar 91 in anchoring assembly 80. Thus, stud 160 and attached bracket 155 may be secured to beam 81 of anchoring assembly 80 in the same manner as slotted bolt 84, which securement was described above.

As shown in FIG. 13, bracket 155 includes a generally trapezoidal transverse section block 164 that protrudes rearward of the rear wall of leg 157 of the bracket. Block 164 is of the proper thickness to be insertably receivable between the opposed arms J of a bicycle fork K. A transversely disposed bore 166 through block 164 is adapted to receive a bolt 167 inserted through slotted openings L in opposed arms J of bicycle fork K, with the arms straddling opposite side walls 169 of the block. A wing nut 168 is used to secure bolt 167 and fork K and attached bicycle (not shown) to bracket 155. A separate theft-protecting locking cable maybe used to secure the bicycle to the truck bed to which anchoring assembly 80 is attached. Preferably, as shown in FIG. 14, a locking cable 195 has a loop 196 on one end for engaging the end of the cable, and a head 200 shaped like that of stud 160, with a slot 203 adapted to slidably receive locking bar 91.

FIG. 15 shows another modified accessory bracket useful for anchoring jet skis or similar objects to the anchoring assembly shown in FIGS. 9 and 10.

As shown in FIG. 15, accessory bracket 175 includes a body 176 that has elements 177 through 183 that are identical in structure and function to elements 157 through 163, respectively, of bracket 155 shown in FIG. 14, and which will not therefore, be described again. Bracket 175 also has a pair of parallel vertically spaced apart, horizontal disposed flange plates 184 that protrude perpendicularly rearwards from rear wall 185 of bracket body 176. Flange plates 184 together with that portion of rear wall 185 between the plates forms a bifurcated structure having a rectangular spaced opening 186 adapted to insertably receive the hull M of a jet ski or small boat. Each of the two bracket flange plates 184 is provided through its thickness dimension with a hole 187 vertically aligned with a corresponding hole in the other flange plate. Thus constructed, bracket 175 is adapted to insertably receive the front part of a jet ski or boat hull M into rectangular opening 186 between flange plates 184. With the hull in this position, a headed locking pin 188 may be inserted through holes 187 in flange plates 184 and a vertically aligned hole N through the hull, thereby securing the jet ski or boat to the bracket. Preferably, the lower end of the shank of locking bolt 188 is provided with a transversely disposed bore adapted to receive a padlock which may be used to prevent unauthorized removal of the jet ski or boat from bracket 175.

What is claimed is:

1. An assembly for anchoring articles such as storage boxes for tools to a structure, said assembly comprising;
   a. a longitudinally elongated hollow beam member having a hollow interior space, said beam member having means for fastening said beam member to a structure and having a wall provided therethrough with at least a first perforation,
   b. at least one article locking member fastenable to an article to be anchored, said locking member including an elongated portion having a smaller transverse section than said perforation and insertable therethrough, said elongated portion having proximate an outer transverse end thereof engagement means for lockable engagement to prevent removal of said elongated portion from said perforation,
   c. a locking bar within said hollow interior space of said beam, said locking bar having therethrough a first cutout section alignable with and non-obstructing of said perforation through said wall of said beam with said locking bar in a first unlocked position permitting insertion of said elongated locking member through said perforation, said locking bar being slidable to a locking position in which portions of said locking bar obstruct a portion of said perforation, said obstructing portion of said locking bar lockingly engaging said lockable engagement means of said locking member protruding through said perforation, said locking bar being of sufficiently less longitudinal extent than said hollow beam member to permit said locking bar to be slid between said locking and unlocked positions without protruding from either end of said hollow beam member, said locking bar including an elongated plate section parallel and proximate to the inner surface of said perforated wall of said beam, said plate section having a second cutout section alignable with said perforation through said beam wall with said locking bar slid to a second unlocked position longitudinally spaced apart from said first unlocked position, and an elongated base section angled away from said plate section,
   d. means for longitudinally slidably supporting said base section of said locking bar, and
   e. slidable operating means located longitudinally between opposite transverse ends of said hollow beam for slidably moving said locking bar between said locking and unlocked positions.

2. The assembly of claim 1 wherein said means for longitudinally slidably supporting said base section comprises in combination at least one longitudinally elongated slotted perforation through said angled beam wall and a fastener disposed transversely with respect to said base section, said fastener having an outer end protruding outwards through said slotted perforation and an inner end fastened to said base section of said locking bar.

3. The assembly of claim 1 wherein said perforation through said wall of said beam are further defined as having a shape similar to that of a keyhole, said perforation including a generally circularly-shaped portion communicating with a radially disposed oval slotted portion having a width less than the diameter of said circularly-shaped portion.

4. The assembly of claim 3 wherein said locking member are further defined as having an elongated shank of smaller diameter than said oval slotted portion of said perforation, and an enlarged diameter head of smaller diameter than said circularly-shaped portion of said perforation, whereby said head may be inserted through said circular portion of said perforation through said beam wall and through said cutout portion of said locking bar with said locking bar in one of said, unlocked positions, said shank moved radially into said slotted portion of said perforation, and said locking bar slid to said, locking position in which said uncut portion of said locking bar overlies a portion of said circular portion of said perforation, thereby preventing withdrawal of said locking member from said perforation.

5. The assembly of claim 1 further including at least a second perforation, said first and second perforations comprising a plurality of longitudinally spaced apart perforations.

6. The assembly of claim 5 wherein said first and second cutout sections comprising a plurality of longitudinally spaced apart cutout sections alignable with said perforations.

7. The assembly of claim 6 further including lockable slide impeding means for impeding slidable movement of said locking bar from said locking position to said first unlocked position.

8. The assembly of claim 7 wherein said lockable slide impeding means is further defined as being lockable to prevent movement of said locking bar from a locked position to an unlocked position.

9. The assembly of claim 3 wherein said lockable slide impeding means is further defined as including a first key lock comprising a first key operated arm rotatable from a position blocking slidable movement of said slidable plate section from said locking position, to a position permitting slidable movement of said plate section in a first direction to said first unlocked position.

10. The assembly of claim 5 further including at least a second article locking member.

11. The assembly of claim 10 wherein said first and second article locking members are further defined as being attached to a single article, whereby engagement of said locking members by said locking bar secures said article against rotation with respect to said assembly.

* * * * *